April 18, 1950           F. E. SMITH           2,504,230
ROTARY HELICAL COMPRESSOR OR ENGINE
Filed Aug. 11, 1944           3 Sheets-Sheet 1
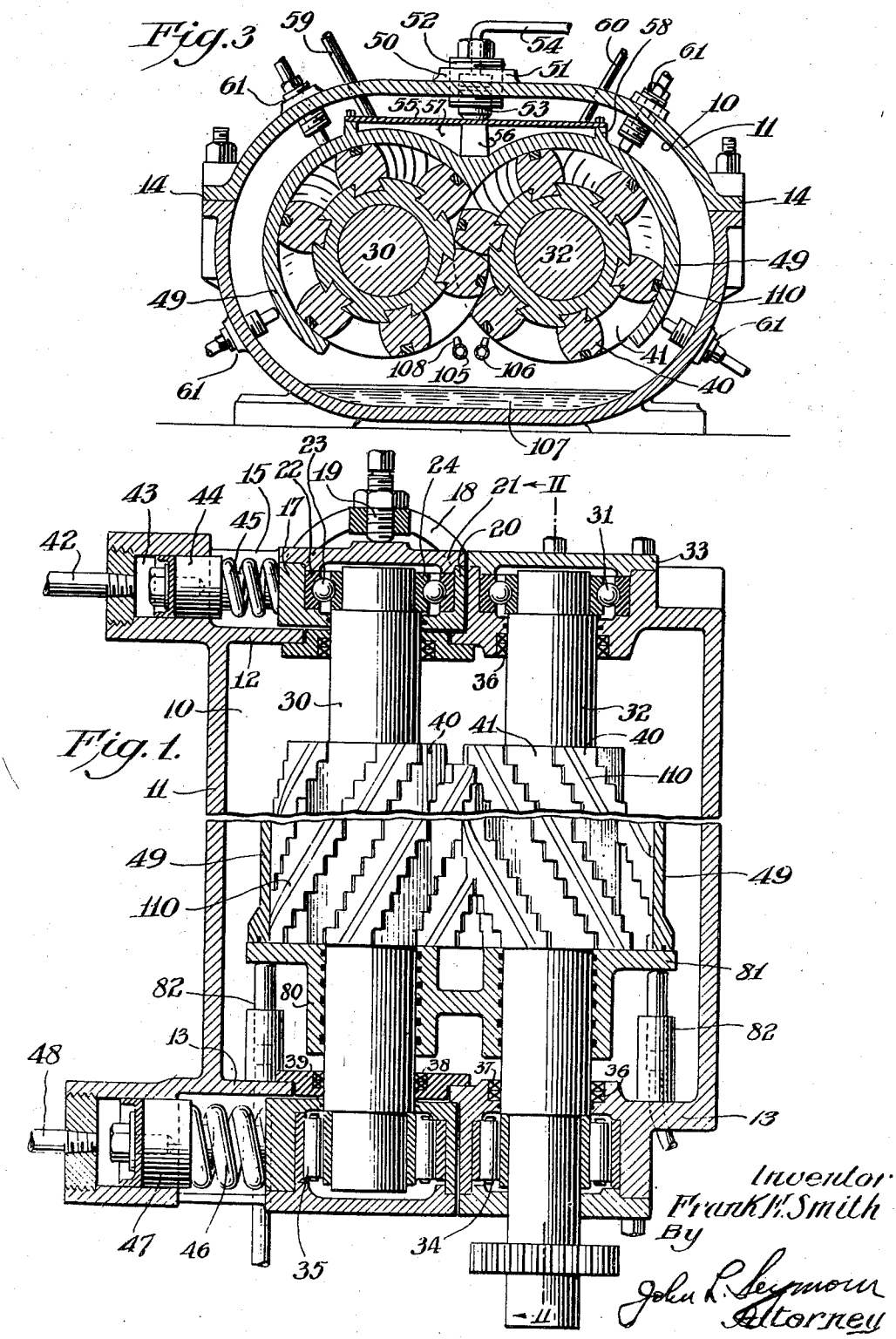

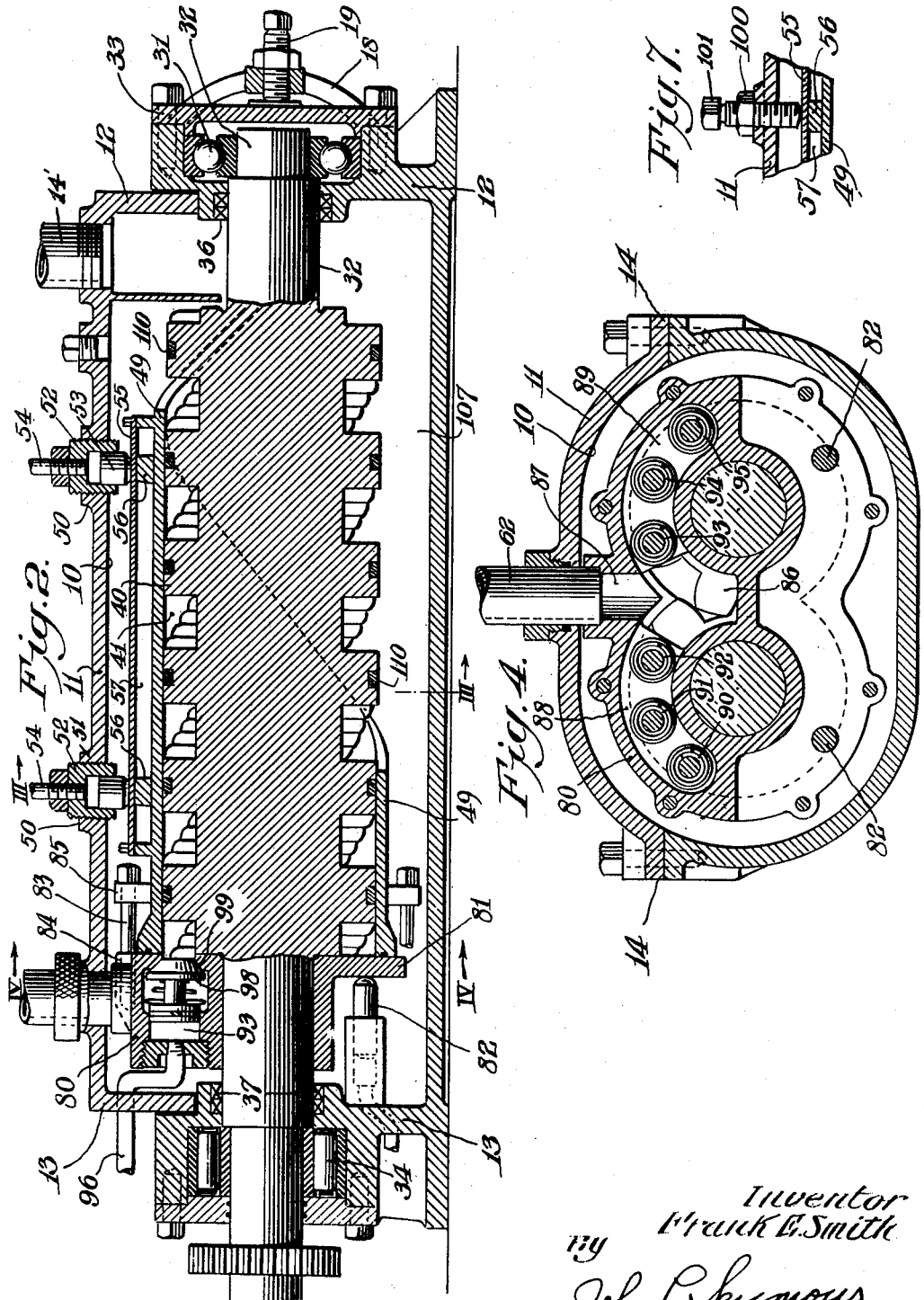

April 18, 1950   F. E. SMITH   2,504,230
ROTARY HELICAL COMPRESSOR OR ENGINE
Filed Aug. 11, 1944   3 Sheets-Sheet 3

Inventor
Frank E. Smith
By John L. Seymour
Attorney.

Patented Apr. 18, 1950

2,504,230

UNITED STATES PATENT OFFICE 2,504,230

ROTARY HELICAL COMPRESSOR OR ENGINE

Frank E. Smith, Niagara Falls, N. Y.

Application August 11, 1944, Serial No. 549,107

23 Claims. (Cl. 230—143)

This invention relates to a machine which is useful both as a compressor and as an engine. It relates particularly to a compressor-engine of the class which has rollers with intermeshing helical lands and grooves.

It is an object of the invention to make a new and improved compressor-engine.

A second object of the invention is to make a compressor-engine having intermeshing helical rollers which are laterally displaceable to provide for the ejection of solids.

A third object of the invention is to provide a compressor-engine of the helical roller type whose rollers are extensible when hot.

A fourth object of the invention is to seal the working areas of a compressor-engine having intermeshing helical lands and grooves by a casing which bears upon rollers with adjustable pressure.

A fifth object of the invention is to seal the ends of the grooves of a helical roller compressor-engine by a plate having adjustable pressure.

A sixth object of the invention is to provide thrust bearings for the rollers of a helical roller type compressor-engine which are adjustable to carry an equal load.

A seventh object of the invention is to devise a system of pressure control for equalization of the working loads within a helical roller type of compressor-engine.

An eighth object of the invention is to provide a cooling system for casing and rollers which is not used when the machine is operated as an engine.

A ninth object of the invention is to provide a compressor-engine, having intermeshing helical rollers, which has high efficiency at low compression and high efficiency at high compression.

A tenth object of the invention is to provide a compressor-engine of the helical roller type with a positive system of variable release and cut-off.

The objects of the invention are accomplished generally speaking by the compressor-engine which is shown in the drawings and described in detail hereinafter.

In the drawings:

Fig. 1 is a plan view partly in section, and with the mid portion of the machine removed to save space, of my compressor-engine.

Fig. 2 is a vertical sectional view on the line II—II of Fig. 1, looking in the direction of the arrows.

Fig. 3 is a sectional view on the line III—III of Fig. 2.

Fig. 4 is a sectional view on the line IV—IV of Fig. 2, looking in the direction of the arrows.

Fig. 7 is a fragmentary sectional detail, showing a mechanical jack in place on the housing. These may be substituted for the hydraulic jacks of the other figures.

Figure 6:
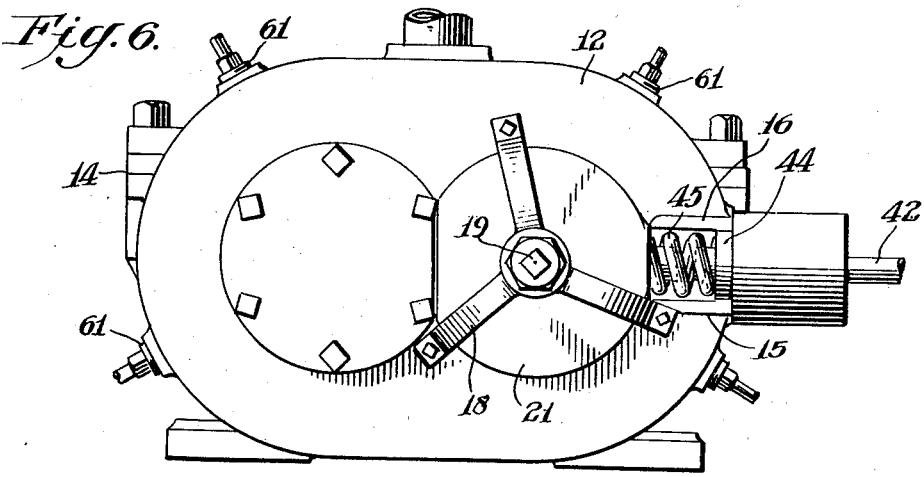
Fig. 6 is a vertical elevational view of the low pressure end of the compressor-engine.

Referring now to the numerals of the drawing, 10 is a housing having a cylindrical body wall 11, end wall 12 at the low pressure end and end wall 13 at the high pressure end. The housing may be conveniently in upper and lower halves bolted together as at 14, and is provided with a lower pressure port 14'. Integral with the end 12 are horizontal flanges 15, 16 Fig. 6 between which the bearing box 17 is slidably mounted. A tripod 18 bolted to the end 12 carries a lock-bolt 19 which can be used to adjust the pressure on the bearing box 17. The bearing box has an inner part 20 and an outer part 21 between which is caught the outer race 22 of the thrust bearing 23 whose inner race 24 is fixed to the end of the roller 30. The box is laterally movable between the flanges, and adjustable by the bolt 19 so that equal pressure will be placed on thrust bearing 23 and thrust bearing 31 supporting one end of roller 32, the races of which are caught between a seat in the end 12 and a cover piece 33. A similar construction supports the high pressure end of the rollers, there being this exception, that the bearings 34, 35 are preferably roller bearings to allow for expansion of the rollers and the tripod adjustment may be omitted. Packing 36, 37 surrounds the ends of roller 32 and packing glands 38, 39 seated on the inside of the housing surround the roller 30 where it passes through the housing. The rollers 30 and 32 have intermeshing, stepped helical lands 40 and grooves 41. With my construction the grooves can be given more capacity than has heretofore been possible.

Occasionally solid particles are caught within the grooves. In former designs the rollers first flattened the particle and then yielded to the extent of their own resiliency to let it pass between them, but if the size of the particle was too great the rollers were sprung or cracked. In my present construction, a pipe 42 brings liquid under pressure to a chamber 43 containing a piston 44 which bears upon a strong spring 45 which thrusts the box 17 toward its adjacent bearing. The pressure used is sufficient to maintain the rollers in operating contact under all normal circumstances. When a solid particle is caught between the rollers, the spring 45 will yield sufficiently to let the particle pass without damage to the rollers. By a similar construction at the other end a spring 46 under the thrust of piston 47, whose force is derived from pipe line 48 bears upon the box containing bearing 35.

In Fig. 1 the high pressure end of the rollers runs in the high pressure head 80 as in bearings, which would nullify the effect of the laterally movable bearing box at that end, but in practice the sleeves of the bearing head will not snugly fit the ends of the rollers, being held in sealing relation to the end of the rollers by other means to be hereinafter described. Therefore, in practice, the yielding mounting of the bearing at the high pressure end of the rollers will be as useful as that at the low pressure end.

The housing 10 does not fit the working areas of the rollers but is spaced considerably apart from them and serves in general the function of a support and housing. Spiral pressure rings 110 are mounted in grooves in the lands.

The working areas of the rollers, that is the areas wherein the work is done by or upon a gas, are covered by a casing 49 which is made of strong but resilient metal. The area of this casing conforms to the working area of the rollers and is, in effect, cut away over the idle areas of the rollers. This gives the plate a wing-like shape over areas of low and intermediate pressure, which greatly increases its flexibility. I have done this deliberately not only to save material but to increase the efficiency of the apparatus, so that it can be run at relatively low pressure or at relatively high pressure with efficiency. When the apparatus is run at high pressures great forces are exerted outward on the casing, which would permit the escape of pressures between the grooves in former constructions unless the casing was made of such close fit that the friction between lands and casing would cause inefficiency when low pressures were being employed. By my new construction it is possible to apply the casing to the lands with that degree of pressure which will produce a most efficient result.

In Fig. 3, 50 are hydraulic jacks mounted in the housing above and between the rollers. These jacks comprise a boss 51 which forms part of the casing and is internally screw threaded, an externally screw threaded cylinder 52 which is mounted in the screw threads of the boss, a piston 53 mounted in the cylinder and a liquid pressure line 54 which delivers liquid at a selected pressure to the cylinder and piston whereby the piston may be made to bear through the plate 55 upon the stud 56 which forms a part or is mounted above the center line of the casing. The plate 55 forms the top of a cooling chamber 57 which is formed between it, the walls 58 which are mounted on the casing, and the casing itself. By means of a series of jacks 50 any desired pressure can be maintained upon the line of intermesh of the rollers.

Water is admitted to the cooling chamber 57 through pipe line 59, which passes through the housing and is withdrawn through pipe line 60. The pipe lines 59 and 60 may move with respect to housing 10, as compression takes place within the casing 49. Arranged about the surface of the housing are hydraulic jacks 61 whose construction is similar to that of jacks 50. By means of these jacks pressures of varying degree can be placed upon the casing to compensate for pressures of varying degree within it. The precise control of local pressures is obtained by the use of jacks of different size or by applying different pressures to jacks of equal size. Since satisfactory results are obtained by using jacks of different size the method of applying pressure to the jacks will be described in relation to such construction.

Figure 5:
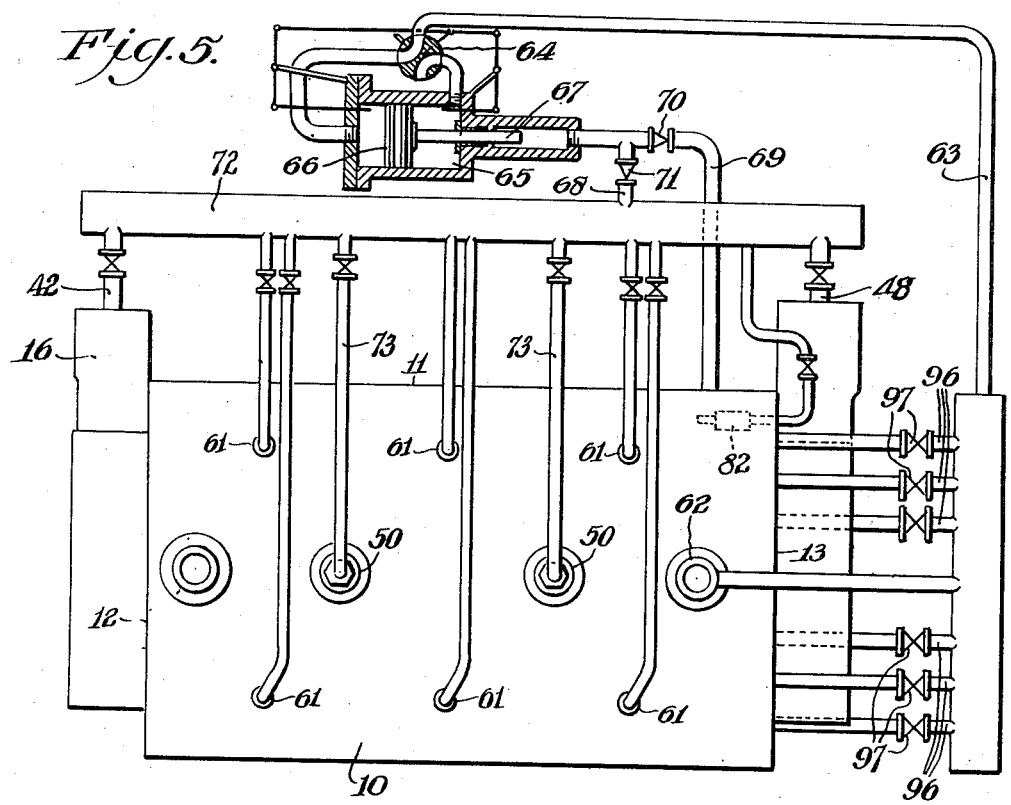
Fig. 5 is a diagrammatic view of the pressure control system.

In Fig. 5 is diagrammatically shown a method of applying pressure to the various hydraulic jacks which are used in balancing the pressure within the casing. In this figure, 62 is the high pressure main through which compressed gases are taken off when the machine is used as a compressor, and through which high pressure gases are admitted when it is used as an engine. From this main a pipe 63 directs pressure to a valve 64 connected with a pump 65 which is of a type capable of maintaining a selected pressure. The pump 65 by use of a piston 66 having a large area and a plunger 67 having a small area may deliver very high pressures to a pressure line 68 if desired. Pumps of this description are known to the art and will not be described in detail herein. A pipe line 69 draws oil or other liquid from a reservoir, not shown, and by means of check valves 70 and 71 delivers it to the distributing head 72 at selected pressure. From the distributing head it is delivered through pipe lines 73 to the jacks which bear upon the bearings of the rollers, the jacks which bear upon the casing, and the jacks to be hereinafter described, which hold the sealing head in position. Each of these lines may have a valve for its control if desired. Certain of these pipe lines are shown as having valves in the drawings and some are shown without them.

The high pressure end of the grooves is sealed by the plate 81 of the head 80. This head has sleeves which encircle but do not necessarily touch the reduced section of the rollers. It is maintained in sealing contact with the ends of the rollers by jacks 82 which are as many in number and so located in position that the head is maintained in firm and sealing relationship with the ends of the lands at all times. These jacks are also connected to the hydraulic system.

In Fig. 2 are shown bolts 83 which are seated in sockets 84, 85 and serve to align and aid in sealing the head with the casing and rollers, but which still permit some outward movement of the casing.

Within the head is a central port 86 which connects the grooves of the rollers through port 87 with the high pressure main 62. Curved chambers 88, 89 extend outward from the port 86 in line with the path of the ends of the roller grooves. Within this chamber are cylinders 90, 91, 92, 93, 94 and 95 which are under gas pressure drawn through pipe lines 96 from the high pressure main 62. These cylinders contain piston valves such as 98—99 illustrated in Figure 2. Three-way valves 97 in each pipe line furnish means for applying or releasing pressure at will to each of these pistons. Pistons valves 98—99 are seated in valve seats 99 in the sealing plate 81. These valves give adjustable cut-off when the machine is used as an engine and adjustable release when it is used as a compressor.

Looking at Fig. 2 and considering the function of the valve therein disclosed, and assuming that the device is functioning as an engine under a main pressure of one hundred pounds per square inch: the pressure fills the space between the piston and the valve and operates with equal force on both, producing no reaction in the valve;

pressure in the cylinder 93 is at one hundred pounds per square inch but pressure in the groove is less than one hundred pounds per square inch because some expansion had taken place since the groove had been filled at the central port 86. Consequently, the valve remains closed.

Assuming that a larger charge at full pressure is desired in the groove: Pressure is released from the cylinder 93 and reduces to fifteen pounds per square inch. Pressure in the groove, however, has fallen for example, to about ninety pounds per square inch and opens the valve admitting a further charge of steam at one hundred pounds per square inch. It is not necessary to work all the valves to secure the desired cut-off or release but only the ones which give the cut-off of release at the desired pressure.

When the machine is used as an engine, steam or other gas at high pressure is applied to the high pressure end of the apparatus, enters the grooves through the central port, and through the valves if they are open, and turns the rollers. Cut-off occurs when the charged grooves have passed beyond the last open charging port after which expansion of the gas within the grooves occurs and performs additional work. The power of the engine may be taken off the roller through a gear or a similar satisfactory device known to the art.

When the machine is used as a compressor, power is applied to one of the rollers through a gear, not shown, and air is admitted at the low pressure end where it fills and is trapped in the grooves and is compressed by the inter-fitting lands. Discharge occurs at highest pressure when the grooves with their compressed charge reach the central port, or at lower pressure if one of the valves is open.

In place of the hydraulic jacks which have been hereinbefore described it is possible to use mechanical jacks of the type shown in Figure 7 at 100 and 101. Such jacks lack the equalizing effect of the fluid system but can be employed with success.

My apparatus can be lubricated in several ways. In Fig. 3 for example, are shown oil lines 105 and 106 which take oil from a sump 107 in a manner which will be understood by engineers and projected through nozzles 108 upon the open sections of the rollers. The method of distributing oil from a sump such as is employed in ordinary engines may be employed here. Alternatively when the apparatus is used as an engine, oil can be admitted with the high pressure steam.

Among the advantages of the invention are the attaining of each of the objects of the invention which have been set forth hereinbefore. Another advantage is the provision of a commercial design for this type of compressor-engine. Other advantages will be apparent to persons skilled in the art.

As many apparently widely different embodiments of this invention may be made without departing from the spirit and scope thereof, it is to be understood that I do not limit myself to the specific embodiments thereof except as defined in the appended claims.

I claim:

1. A compressor-engine comprising rollers with intermeshing, stepped, helical lands and grooves; means to impart power to the rollers; a resilient pressure casing sealing the working areas of the rollers; a housing having relatively movable bearings for the rollers; fluid pressure means bearing upon a relatively movable bearing; adjustable jacks in the housing bearing on the casing; a port for the low pressure ends of the rollers; a pressure head sealing the high pressure end of the rollers, pressure pistons holding the head in sealed position, a chamber in the head, a port connecting said chamber with the grooves of the rollers, piston valves in the chamber wall in the path of the grooves of the rollers, spring means to seat the valves, fluid means to apply and remove pressure from the valve pistons; means to oil the rollers comprising an oil sump and a pressure operated spray line directed at the idle parts of the rollers.

2. A compressor-engine comprising rollers with intermeshing, stepped, helical lands and grooves; means to drive the rollers; a resilient pressure casing sealing the working areas of the rollers; a housing having relatively movable bearings for the rollers; fluid pressure means bearing upon a relatively movable bearing; adjustable jacks in the housing bearing on the casing; means to admit air to the low pressure ends of the rollers; a pressure head sealing the high pressure end of the rollers; pressure pistons holding the head in sealed position; a chamber in the head, a port connecting said chamber with the grooves of the rollers, a piston valve in the path of the grooves of a roller, pressure means to seat the valve, and means to release pressure from the valve piston.

3. A compressor-engine comprising rollers with intermeshing, helical lands and grooves; means to drive the rollers; a resilient metallic pressure casing sealing the working areas of the rollers; a housing enclosing and supporting the rollers and casing; pressure means supported by the housing and bearing upon the pressure casing to hold the pressure casing in sealed position; and pressure sealing means supported by the housing in sealing engagement with the high pressure end of the rollers.

4. A compressor-engine comprising rollers with intermeshing helical lands and grooves; supports for the ends of said rollers comprising bearings, one pair of which is laterally movable with respect to the other pair; supports for said movable bearings, springs thrust against said movable bearings, pistons bearing on the springs, and means to supply fluid pressure to said pistons whereby said rollers are normally maintained in operating contact.

5. A compressor-engine comprising helical intermeshing rollers, bearings supporting adjacent ends of each roller, means to mount one of said bearings for lateral motion, fluid pressure means to force said movable bearing toward the other bearing, and resilient means permitting said bearing to yield.

6. A compressor-engine having laterally displaceable helical rollers, and fluid pressure means to oppose forces tending to separate them.

7. A compressor-engine comprising rollers with intermeshing helical lands and grooves and a pressure casing comprising resilient metal substantially conforming to the working areas of the rollers, means to hold said casing in sealing relation to said rollers comprising fluid pressure jacks mounted in a housing and bearing thereon, and means to supply fluid pressure to said jacks.

8. A compressor-engine comprising a housing having bearings and fluid pressure jacks, intermeshing helical rollers mounted in said bearings, and a pressure casing pressed by said jacks to seal the working areas of the rollers.

9. Means for sealing the pressure areas of a rotary helical compressor-engine comprising a pressure casing conforming to the shape of the working areas of the helixes and means to hold said casing in sealed relation comprising jacks arranged thereabout and bearing thereupon, and means to apply pressure to the jacks.

10. Means for sealing the pressure areas of a rotary helical compressor-engine comprising a pressure casing conforming to the shape of the working areas of the helixes, and means to apply pressure to the outside thereof.

11. A compressor-engine comprising helical rollers having grooves terminating in the ends of the rollers and having shafts mounted in bearings; means to seal the end of said rollers comprising a head having sleeves about said shafts and a plate sealing the ends of the roller grooves, a chamber, ports in said plate connecting with said chamber, piston valves sealing certain of said ports, and means to apply to and release fluid pressure from said pistons.

12. In a compressor-engine intermeshing helical rollers, a casing sealing the working areas thereof, and means to vary the pressure of the casing against the rollers.

13. A compressor-engine comprising rollers having intermeshing helical lands and grooves, means to seal the tops of the working portions of said grooves, means to seal the ends of the working portions of said grooves comprising a plate in sealing contact with the end of said rollers, openings in said plate in the path of said grooves, a plurality of pressure controlled, separately operable valves to seal and release said openings, a port in the path of said grooves, and means connecting said openings with said port.

14. A compressor-engine comprising intermeshing helical lands and grooves sealed by a pressure casing extending to the end of said grooves and by an end plate making contact with the end of said pressure casing and with the ends of said lands, and means to hold said end plate in sealing relation with said grooves comprising pressure operated jacks bearing thereupon.

15. A compressor-engine comprising a supporting housing, bearings in said housing, intermeshing helical rollers mounted in said bearings, a pressure casing to seal the tops and a pressure plate to seal the ends of the grooves in said rollers, pressure means to hold the casing in sealed relationship, pressure means to hold the end plate in sealed relationship, and pressure means to hold the rollers in sealed relationship along the line of intermesh.

16. A compressor comprising intermeshing helical rollers, means to seal the tops of the grooves thereof comprising a pressure casing and means to apply external pressure thereto, means to seal the ends of said grooves of the rollers comprising a pressure plate having a discharge port, means to hold the plate in sealed relation to the end of the rollers, and means to hold the rollers in sealing relation along the line of intermesh comprising relatively movable bearings for said rollers and pressure means to thrust said bearings together.

17. A compressor-engine having intermeshing helical rollers, variable pressure means to seal the working areas of the rollers, and means to apply pressure to the said means comprising a pump operated by the high pressure gas of the machine to apply liquid pressure to the said variable means.

18. A compressor-engine comprising intermeshing rollers having long, helical lands and compression grooves in which gas is compressed from end to end by the advance of a helical land in the cooperating groove, casing means to seal the tops of the working areas of the grooves, means to seal the high pressure ends of the grooves during compression, said casing means and end sealing means being constructed and arranged for displacement outwardly from the normal working position of the rollers, and fluid pressure means operable by pressure from said engine engaged with said casing and end sealing means to maintain them in sealing contact with said rollers.

19. A compressor-engine comprising intermeshing rollers having long, helical lands and compression grooves in which gas is compressed from end to end by the advance of a helical land in the cooperating groove, casing means to seal the tops of the working areas of the grooves, means to seal the high pressure ends of the grooves during compression, said casing means and end sealing means being constructed and arranged for displacement outwardly from the normal working position of the rollers, and fluid pressure means engaged with said casing and end sealing means to maintain them in sealing contact with said rollers.

20. A helical roller type compressor-engine having displaceable sealing means engaged with the cylindrical part of the rollers, displaceable sealing means engaged with the high pressure end of the rollers, and pressure means bearing upon said means in opposition to the force exerted within the grooves in said rollers.

21. A compressor-engine having rollers with intermeshing helical lands and grooves constructed and arranged to compress gas by the endwise advance of a land in a groove, and means to give variable cut-off when operated as an engine and variable discharge when operated as a compressor comprising means to seal the high pressure ends of the grooves, a plurality of piston valves in said means communicating with the grooves, and fluid pressure means constructed and arranged to operate the piston valves.

22. A compressor-engine having laterally displaceable helical rollers and means to support them in operative contact comprising laterally displaceable casing means, laterally displaceable bearings, and power means bearing on casing and bearings in a direction opposed to the said lateral displaceability.

23. In a compressor-engine having helical intermeshing rollers, casing means in sealing engagement with the helices, said means having displaceable parts permitting lateral displacement of the rollers, and displaceable bearing means constructed and arranged to support the rollers in operative engagement and to return the rollers to normal position after displacement.

FRANK E. SMITH.

REFERENCES CITED

The following references are of record in the file of this patent:

UNITED STATES PATENTS

| Number | Name | Date |
|---|---|---|
| 2,302 | Stewart | Oct. 11, 1841 |
| 345,969 | Harrold | July 20, 1886 |
| 395,956 | Day | Jan. 8, 1889 |
| 718,725 | Pearse et al. | Jan. 20, 1903 |
| 941,426 | Loudon | Nov. 30, 1909 |
| 1,004,776 | Green | Oct. 3, 1911 |

(Other references on following page)

UNITED STATES PATENTS

| Number | Name | Date |
|---|---|---|
| 1,016,017 | Koltschanoff | Jan. 30, 1912 |
| 1,035,385 | Pearsall | Aug. 13, 1912 |
| 1,270,872 | Roberts et al. | July 2, 1918 |
| 1,712,157 | Morita | May 7, 1929 |
| 1,896,754 | Ronning | Feb. 7, 1933 |
| 1,989,552 | Good | Jan. 29, 1935 |
| 2,044,873 | Beust | June 23, 1936 |
| 2,078,334 | Martocello | Apr. 27, 1937 |
| 2,211,154 | Oshei | Aug. 13, 1940 |
| 2,220,588 | Thompson | Nov. 5, 1940 |
| 2,266,820 | Smith | Dec. 23, 1941 |
| 2,358,815 | Lysholm | Sept. 26, 1944 |

FOREIGN PATENTS

| Number | Country | Date |
|---|---|---|
| 384,355 | Great Britain | Dec. 8, 1932 |
| 420,501 | Great Britain | Dec. 3, 1934 |
| 459,631 | Germany | May 10, 1928 |
| 464,494 | Great Britain | Apr. 16, 1937 |
| 509,247 | Great Britain | July 7, 1938 |